April 23, 1968  J. S. CONDE  3,379,218
CLOSURE SLEEVE FOR PIPES OR THE LIKE
Filed July 29, 1965
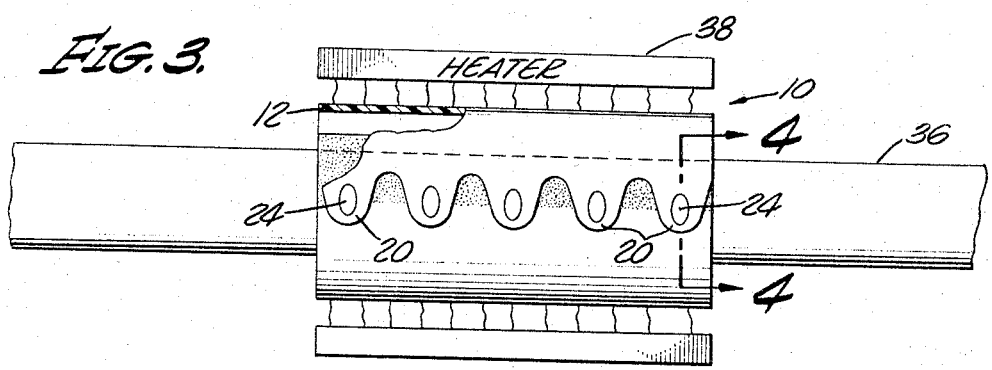
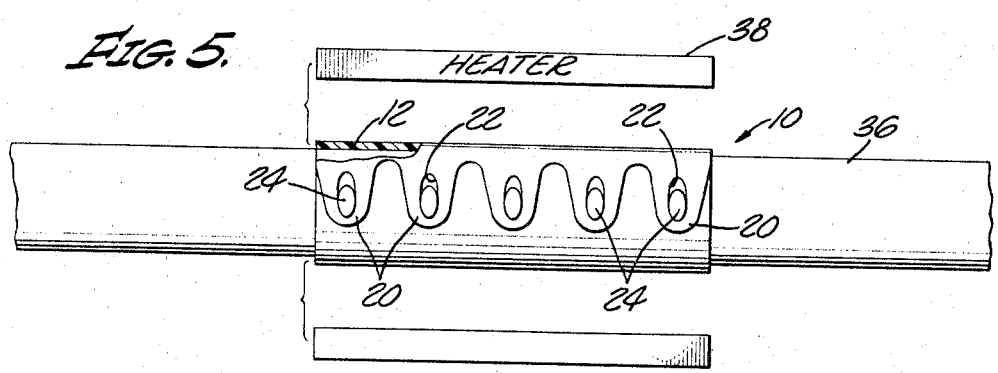
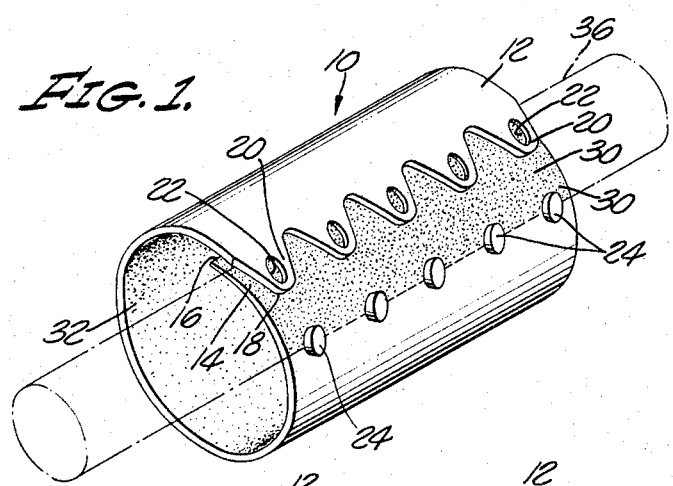
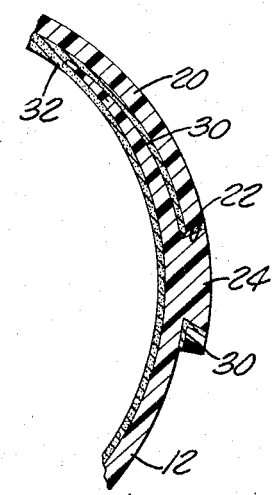
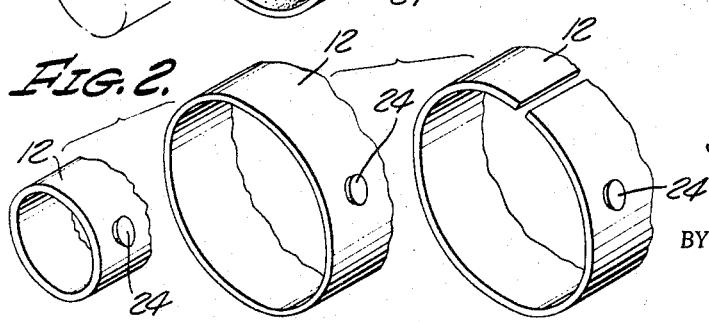
JULIAN S. CONDE
INVENTOR.
BY Lyon & Lyon
ATTORNEYS

United States Patent Office 3,379,218
Patented Apr. 23, 1968

3,379,218
CLOSURE SLEEVE FOR PIPES OR THE LIKE
Julian S. Conde, Belmont, Calif., assignor to Raychem Corporation, Redwood City, Calif., a corporation of California
Filed July 29, 1965, Ser. No. 475,742
15 Claims. (Cl. 138—99)

ABSTRACT OF THE DISCLOSURE

A closure sleeve for pipes or the like constructed from a piece of independently dimensionally heat unstable material, that is, material that will return to its original shape and dimensions upon application of heat alone. The edges of the piece of material are held together by the cooperation of protuberances formed on one edge with holes formed along the other edge which is preferably scalloped.

This invention relates to a closure member for elongated members and more particularly relates to a wrap-around closure sleeve which can easily and conveniently be installed on pipes, cables and the like.

There are many instances where it is desirable to provide a seal or other closure for an elongated tubular member without requiring that the tubular member be disconnected or otherwise displaced from its original position. For example, when a crack occurs in a lead jacketed cable, it is necessary to repair the crack in the jacket and then seal and strain-relieve it. As another example, when a pipe carrying gas, water or other fluid cracks, it is desirable that the leak or break in the pipe be sealed and protected without removing the pipe from the pipeline.

Various methods and apparatus are now available for sealing and strengthening a cable or pipe. One of the most widely used is the use of a suitable clamp in connection with a pad or wrap of resilient sealing material, the resilient material being placed over the leak and the clamp then tightened by means of bolts or the like until it firmly engages the pipe. While this method is in some respects satisfactory, there are obvious disadvantages to its use. First, the expense of the clamp itself is considerable and if the cable or pipe is buried in the ground or other corrosive medium, the clamp will eventually be corroded unless added precautions are taken. Second, the installation of such a clamp is a rather time-consuming operation. Third, and perhaps most important, are the physical limitations of the clamp itself. The clamp, once formed, can only be used to cover a fairly small axial length of a single diameter pipe. A large number of clamps must therefore be continuously available to fit the large number of different diameter pipes and cables that are in use.

Another method presently in use involves the wrapping of a suitable tape around the pipe. This method, however, is not completely satisfactory because of the large amount of skilled labor required and the lack of integrity due to the many seams or joints incurred.

It is accordingly an object of the present invention to provide a closure member for pipes or other elongated members which is cheaper, more versatile, more reliable and easier to install than any heretofore known.

It is another object of the present invention to provide such a closure member that can be adapted for use on different diameter pipes.

It is another object of the present invention to provide such a closure member that can be adjusted to satisfy any given situation with respect to either pipe diameter or axial length of pipe to be covered.

It is a further object of the present invention to provide such a closure member which is in one piece and which need only be wrapped around the elongated member once and secured.

It is still a further object of the present invention to provide such a closure member in the form of a sleeve which has a separation along its entire length and which is internally coated with a suitable sealing material.

These and other objects of the present invention will become more apparent upon reference to the accompanying description and drawings in which:

FIGURE 1 is a perspective view of the closure member of the present invention;

FIGURE 2 is a perspective view showing the various stages in the manufacture of a closure member according to the present invention;

FIGURE 3 is a plan view, partly cut away, of the closure member of the present invention after it is initially installed on a pipe;

FIGURE 4 is a cross-sectional view taken along lines 4—4 of FIGURE 3;

FIGURE 5 is a plan view partly broken away, of the closure member of the present invention after its installation on the pipe has been completed.

Briefly, the present invention comprises the use of an independently dimensionally heat unstable member or sleeve as a closure member. In general, such a member or sleeve is made of a material having the property of plastic or elastic memory which is heated to above its crystalline melting temperature and expanded under pressure to a diameter greater than its normal diameter and then cooled while kept under pressure. A member or sleeve treated in this manner will retain its expanded position until it is again heated to its crystalline melting temperature at which time it will recover to its original shape. Examples of such heat-recoverable sleeves may be found in Currie U.S. Patent 2,027,962 and Cook et al. U.S. Patent 3,086,242, the disclosures of which are incorporated herein by reference. Polymeric materials which have been cross-linked by chemical means or by irradiation, for example, with high energy electrons or nuclear radiation, such as those disclosed in the Cook et al. patent, are preferred for use in the present invention. Noncrystalline polymeric materials exhibiting the property of plastic or elastic memory, such as polyurethane, ionomers, etc., could also be used in practicing the present invention.

According to the present invention, such a sleeve is expanded and cooled and then slit or otherwise severed along its entire length. The facing edges of the split sleeve are provided with some kind of cooperating fastening devices, for example, one side is provided with buttons and the other side is provided with corresponding buttonholes, and the interior surface of the sleeve is coated with a suitable sealing material. If desired, an adhesive can be applied to the surface around the buttonholes or around the buttons to make a firmer connection between the two split sides of the sleeve. The sleeve can now be wrapped around a pipe or other elongated member, the edges overlapped, and the fastening means fastened. By heating the sleeve to a temperature above the crystalline melting temperature of the material from which it is constructed, the sleeve will recover towards its original shape and will firmly engage the pipe. The sealing coat will also become flowable and will make a good bond with the pipe. The adhesive will set to form a bond between the two edges of the sleeve and reinforce the action of the fastening means.

Once a sleeve has been formed, one edge of the split sleeve can be cut back any distance desired so that the sleeve can be made to fit a wide variety of pipe diameters. If a larger diameter sleeve is required, several sleeves can be fastened together in a chain until the necessary diameter is attained. The sleeve can be cut along its longitudinal axis so that it can be made to cover almost any desired axial portion of the pipe or other elongated member.

Turning now to FIGURE 1, there is shown a wrap-around closure member 10 according to the present invention. The closure member 10 includes a dimensionally heat unstable sleeve 12 having a separation 14 along its entire axial length so that two facing edges 16 and 18 are formed. The edge 18 is scalloped to form a plurality of tabs 20, each of which is provided with an aperture or buttonhole 22. The edge 16 is preferably tapered down to a feather edge so that when the edges 16 and 18 are overlapped no pronounced bulge or step will be formed.

The portion of the sleeve 12 terminating in the edge 16 is provided with a plurality of protuberances or buttons 24 for cooperating with the buttonholes 22. The buttons 24 are preferably elongated in the circumferential direction to provide them with greater strength against the shearing forces that are exerted when the sleeve is shrunk. The elongation of the buttons 24 result in their presenting almost a rectilinear shape to the shearing force rather than a perfectly round shape. As can thus be seen in FIGURE 4, the buttons 24 are provided with an undercut, preferably at an angle of about 30°. The buttonholes are also provided with a corresponding angle so that when a force is exerted tending to pull the edges 16 and 18 apart, the tabs 20 will be caused to ride downwardly on the buttons 24 and into engagement with the sleeve rather than away from it.

The outer surface of the sleeve 12 adjacent the edge 16 and extending back beyond the buttons 24 is preferably coated with a heat-activated adhesive 30. When heated, this adhesive will become fluid and form a bond between the tabs 20 and the outer portion of the sleeve around the buttons 24 and the inner surface of the sleeve around the buttonholes 22 and under the tabs 20. The entire inner surface of the sleeve 12, with the exception of the area of overlap under the tabs 20 which the adhesive 30 will engage is coated with a suitable sealing material 32. This sealing material can comprise any conventional mastic, as will be apparent to those skilled in the art. The temperature at which the adhesive 30 and the sealer 32 become active are both preferably below the temperature at which the sleeve 12 will recover.

The closure member of FIGURE 1 is preferably formed by molding a material having the property of plastic or elastic memory into a tube having a series of protuberances or buttons formed in a longitudinal row on the outer surface. The tube is then expanded to its desired final size. This may conveniently be done by immersing the tube in a bath of glycerine heated to above the crystalline melting temperature of the material and expanding over a mandrel having a diameter of the desired size. The tube is then removed from the glycerine bath while still positioned on the last mandrel and cooled. A longitudinal separation is now made along the entire length of the tube or sleeve. The configuration of the tube after each of these steps is shown in FIGURE 2.

The longitudinal separation can initially be a simple slit and the sleeve then provided with the scalloped edge and buttonholes, or the operation may be accomplished in a single step by the use of a suitable punch and die as will be obvious to those skilled in the art. The edge 16 may now be machined down to the desired feather edge. Although it would be possible to leave the edge 18 as a straight edge, it is desirable to provide it with a scalloped configuration so that the tabs 20 will lie down flat on the opposing edge of the sleeve when the buttons are first fastened and after the sleeve has been recovered. As will be obvious to those skilled in the art, a substantial shearing force is exerted on the buttons and on the buttonholes when the sleeve is recovered and therefore the buttonholes 22 must be positioned far enough from the leading edge of the tab 20 so that sufficient material is present to resist this shearing force. The actual distance, of course, is also a function of the thickness of the sleeve material.

FIGURES 3 and 5 illustrate how the closure member 10 is used in conjunction with an elongated member. In FIGURE 3, the closure member 10 has been wrapped around an elongated member 36 and the buttons 24 snapped into the buttonholes 22. A heater 38, which may be any conventional heater such as an infrared or hot air heater, is now positioned around the closure member 10 and actuated. As the temperature of the closure member 10 rises, the adhesive 30 is activated and forms a bond between the tabs 20 and the upper surface of the sleeve 12 adjacent the edge 16. The sealer material 32 is also activated. As the temperature continues to rise, the crystalline melting temperature of the material of the sleeve 12 is reached and the sleeve begins to recover to its original diameter. As it does so, it engages the elongated member or pipe 36 and tightly grips it. The sealer material 32 causes a seal or bond to be formed between the closure member 10 and the elongated member 36 and since the edges 16 and 18 of the sleeve are overlapped, the closure member forms an uninterrupted protective surface. The shrinkage of the sleeve 12 will cause a shearing force to be exerted on the buttons 24 and buttonholes 22 which will result in the buttonholes 22 being substantially elongated from their original size.

As can be seen, the closure member 10 can be severed anywhere along its length, so long, of course as at least one button and one buttonhole remain, so that it may be used to cover any desired axial length of the elongated member 36. Since the sleeve 12 will shrink to a predetermined diameter, the closure member 10 can be used on any pipe having a diameter larger than the predetermined diameter of the sleeve 12 and thus the single closure member 10 can be used on a wide variety of pipes. If the pipe has a larger diameter than a single sleeve, two or more sleeves can be engaged by fastening the buttonholes of one to the buttonholes of the other to form a composite sleeve large enough to fit the particular pipe. If the pipe diameter is small, the edge of the sleeve 18 can be cut back so that the predetermined diameter of the sleeve 12 is reduced. That is, new tabs 20 and buttonholes 22 can be formed further back from the original edge 18 of the sleeve without in any way affecting the ability of the sleeve 12 to recover. In such an event, of course, the diameter to which the sleeve will attempt to recover will be smaller than the original diameter of the tubing before it was expanded. It can thus be seen that the closure member of the present invention is extremely versatile in that it is adaptable for use on almost any size pipe or elongated member. It is also simple and convenient to install, and if necessary, can be removed by again heating it to above the crystalline melting temperature of the material from which the sleeve is constructed.

It should be understood that the button and buttonhole arrangement is only an illustrative embodiment of a mechanical fastening means and that other mechanical fastening means can equally well be used to engage the two facing edges of the sleeve. As will be obvious to those skilled in the art, closure members according to the present invention can be made in shapes and forms other than that shown and described as may be required to fit various objects. For example, a closure member in the shape of a T may be constructed to fit a pipe T. Therefore, the term "sleeve" as used herein is intended to embrace all such shapes and forms, as is the term "tubular member." The present embodiment is therefore to be considered in all respects as illustrative and not restrictive, the scope of the invention being indicated by the appended claims rather than by the foregoing description, and all changes which come within the meaning and range of equivalency of the claims are therefore intended to be embraced therein.

I claim:

1. A heat recoverable closure member adapted to be heat recovered onto an object having a larger dimension in the direction of recovery than said member after recovery, comprising: a piece of material which has been dimensionally changed from an original heat stable form to an independently dimensionally heat unstable form capable of moving in the direction of its original form upon the application of heat alone, said piece of material having first and second edges which can be brought together to form a tubular member, mechanical means for selectively engaging or disengaging said edges with one another, said mechanical means being capable of maintaining said edges together during heat recovery of said piece of material around said object.

2. The closure member of claim 1 wherein at least a portion of said mechanical means are integral with said piece of material.

3. The closure member of claim 2 wherein the separating forces exerted on said edges by recovery of said piece of material are absorbed by said mechanical means.

4. The closure member of claim 1 wherein the surface of said piece of material which is to be adjacent said object is provided with a layer of sealing material.

5. The closure member of claim 4 wherein said sealing material is heat-activated.

6. The closure member of claim 5 wherein the activating temperature of said sealing material is below the crystalline melting temperature of said piece of material.

7. The closure member of claim 2 wherein said means comprises a hole formed in said piece of material adjacent said first edge and a corresponding protuberance formed on one surface of said piece of material adjacent said second edge.

8. The closure member of claim 7 wherein the inner surface of said piece of material is provided with a layer of sealing material.

9. The closure member of claim 1 wherein said piece of material comprises a cross-linked polymer.

10. The closure member of claim 9 wherein said piece of material comprises an irradiated polymer.

11. The closure member of claim 7 wherein said protuberance is undercut in the region in which it engages the leading edges of said hole.

12. The closure member of claim 11 wherein said protuberance is elongated in the direction perpendicular to said second edge.

13. A closure member comprising a piece of material which has been dimensionally changed from an original heat stable form to an independently dimensionally heat unstable form capable of moving in the direction of its original form upon the application of heat alone, said piece of material having first and second edges, a plurality of holes formed in said piece of material adjacent said first edge, a plurality of integral protuberances formed on the outer surface of said piece of material adjacent said second edge, said protuberances cooperating with said holes to fasten said edges together such that their surfaces are in overlapping relationship, said protuberances being elongated in the direction perpendicular to said second edge and being undercut in the region in which they engage the leading edges of said holes, the thickness of said piece of material being tapered from said protuberances toward said second edge, a layer of heat activated sealing material deposited on the inner surface of said piece of material, the activating temperature of said sealing material being below the crystalline melting temperature of said piece of material, and a layer of heat activated adhesive material deposited on said overlapping surfaces, the cooperation of said holes and protuberances permitting a tubular member to be formed from said piece of material.

14. The closure member of claim 13 wherein heat recovery of said material as a result of its being heated to its crystalline melting temperature while assembled upon a structure to be sealed causes a shearing force to be exerted on the protuberances and holes which results in the holes being substantially elongated from their original size.

15. The closure member of claim 13 wherein said first edge of said material has a plurality of integral tabs extending therefrom and spaced along the length of said edge, each of said holes being formed in one of said tabs.

References Cited

UNITED STATES PATENTS

| | | | |
|---|---|---|---|
| 81,300 | 8/1868 | Sedgwick. | |
| 141,536 | 8/1873 | Bellemere et al. | 138—99 |
| 158,554 | 1/1875 | Whitcomb | 138—99 |
| 229,699 | 7/1880 | Hale | 24—16 |
| 326,012 | 9/1885 | Brooks | 138—99 |
| 581,414 | 4/1897 | Cressler | 138—166 |
| 742,689 | 10/1903 | Lord | 138—151 |
| 1,811,984 | 6/1931 | Taft | 138—149 |
| 2,027,962 | 1/1936 | Currie | 264—230 |
| 2,719,099 | 9/1955 | Holbrook | 138—149 |
| 2,756,172 | 7/1956 | Kidd | 138—147 |
| 2,937,664 | 5/1960 | Plummer | 138—168 X |
| 2,960,581 | 11/1960 | Plummer | 138—168 X |
| 2,966,226 | 12/1960 | Kalis | 138—99 X |
| 3,086,242 | 4/1963 | Cook et al. | 264—95 |
| 3,109,212 | 11/1963 | Emery | 24—16 |

LAVERNE D. GEIGER, *Primary Examiner.*

H. BELL, *Assistant Examiner.*